June 29, 1926.
E. F. HULBERT
1,590,753
METHOD OF MAKING REENFORCED CLOSURES
Filed Oct. 23, 1925
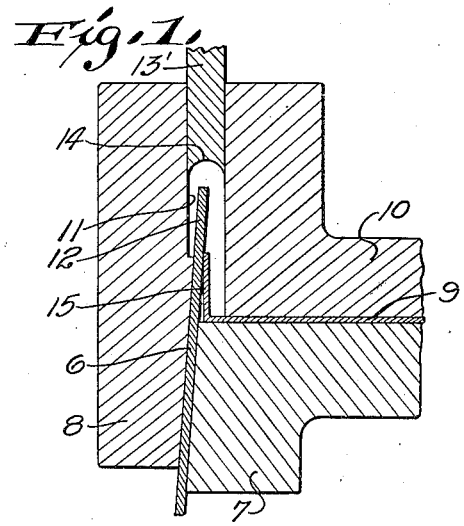
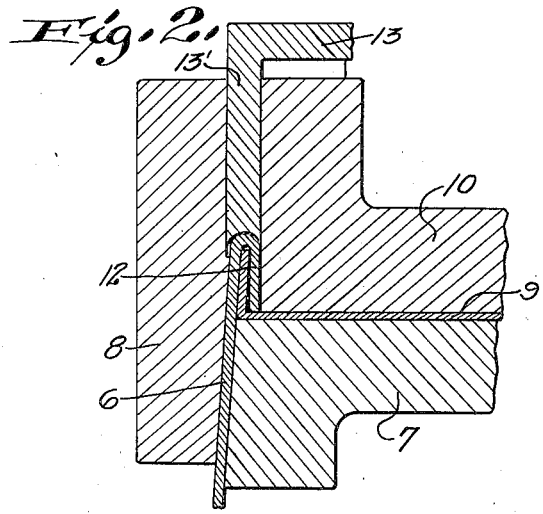
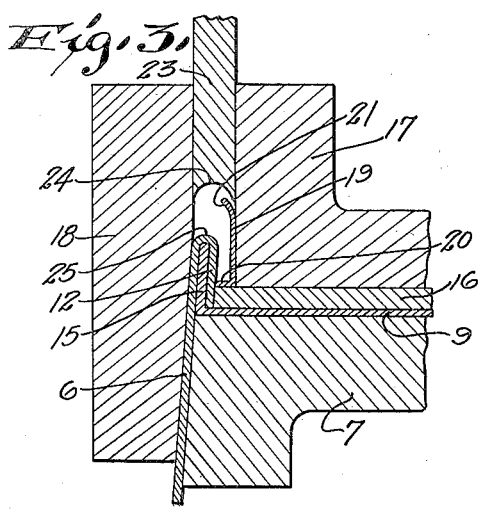
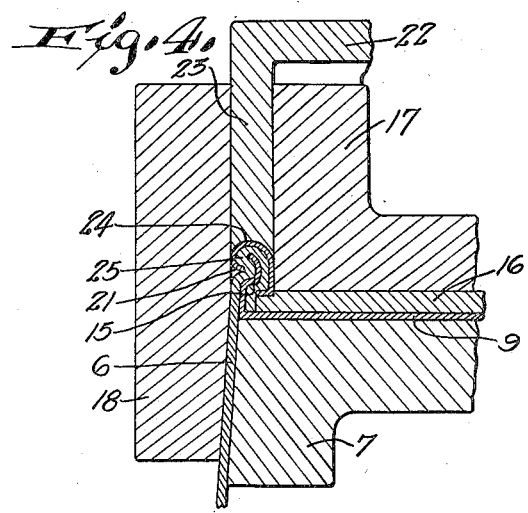
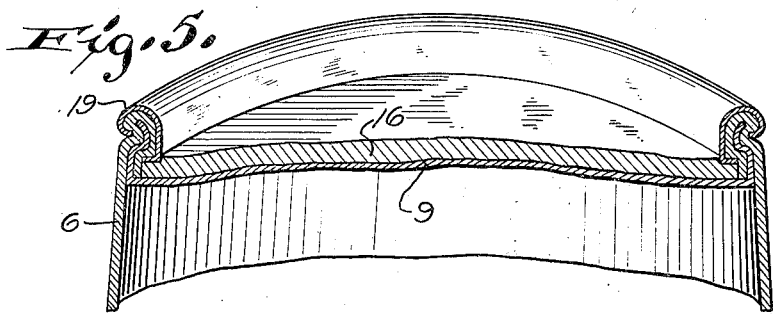
INVENTOR.
Edwin F. Hulbert
BY
Juarles & French
ATTORNEYS Patented June 29, 1926.

1,590,753

UNITED STATES PATENT OFFICE.

EDWIN F. HULBERT, OF MILWAUKEE, WISCONSIN, ASSIGNOR, BY MESNE ASSIGNMENTS, TO THE MASTER PACKAGE CORPORATION OF DELAWARE.

METHOD OF MAKING REENFORCED CLOSURES.

Application filed October 23, 1925. Serial No. 64,473.

The invention relates to a method of making reenforced closures.

The object of this invention is to provide a method of attaching a dished head to the fibre siding of the container, whereby the flanged portion of said head is gripped between parts of said siding and is firmly clamped thereto by a metal band which also clamps the disk portion of said head between it and the dished portion of said head.

The invention further consists in the several features hereinafter set forth and more particularly defined by claims at the conclusion hereof.

In the drawings, Fig. 1 is a detail sectional view of some of the container parts initially positioned for assembly.

Fig. 2 is a view similar to Fig. 1, showing the parts partially assembled;

Fig. 3 is a view similar to Fig. 2, showing the parts positioned to receive the metal band;

Fig. 4 is a view similar to Fig. 3, showing the parts as finally assembled;

Fig. 5 is an elevation view of the finished closure, with parts broken away and parts shown in section.

The fibre siding 6 of pressed pulp or wound fibre or paper, in the form of cylindrical or conical tubing, is firmly held between an internal chuck 7 and an external contractible chuck 8, and a dished fibre head part 9 is inserted in the siding and clamped against the chuck 7 by a clamping plunger 10. The chuck 8 has a relief surface 11 to provide clearance between it and the upper edge 12 of the siding, and a plunger 13 having an annular part 13' provided with a curved edge 14 works between the chuck 8 and the plunger 10 and is moved down from the position shown in Fig. 1 to turn the edge 12 over the top of the flange 15 and into the space between said flange and the plunger 10, after which plunger 10 and chuck 8 are withdrawn and the disk part 16 of the dished head is inserted within the inturned edge of the siding and moved down into engagement with the main body portion of the head part 9 by a clamping plunger 17, and another chuck 18 is applied to the outer side of the siding and a thin sheet-metal band 19, having a base flange 20 and a slightly curved upper edge 21, is inserted within the bent-over edge 12 of the siding so that the parts are positioned as shown in Fig. 2.

Thereafter, a plunger 22, having an annular forming part 23 provided with a curved edge 24, is moved down between the chuck 18 and the plunger 17, and during its movement bends the edge 21 of the band 19 over the arched portion 25 of the siding, and during the last part of the travel of the plunger 22 the flange 15, with said arched portion, is forced over the head against the flange 20 and the edge 21 of the band is forced into the siding.

The above described method results in the construction of a very strong closure, as the parts projecting from the head form a multi-ply edge reenforced by the metal band 19, and a substantial head-rest for the disk part 16 of the head which is also firmly clamped between this reenforced edge and the dished portion of the head.

What I claim as my invention is:

1. The method of forming a reenforced fibre container which consists in inserting a dished head member within a siding and bending an edge part of the siding against the flanged portion of this dished member, inserting a disk head member within the bent-over edge of the siding and against said dished head member, positioning a metal band within the bent-over edge of the siding, and exerting pressure on said band to clamp it over said bent-over edge and against the disk head member.

2. The method of forming a reenforced fibre container which consists in bending an edge portion of a siding over the flanged portion of a dished head member inserted within the siding, inserting a disk head member within the bent-over edge of the siding and against said dished head member, positioning a metal band having a base flange within said bent-over edge with its flange adjacent the siding, bending the upper edge of the band over the bent-over edge of the siding and forcing said bent-over edge laterally over the main body portion of the head.

3. The method of making a reenforced fibre container having a dished head, which consists in crimping together the upper end of the siding, the flanged portion of the dished head, and a portion of an angled metal band adjacent said flanged portion and displacing these crimped portions laterally to firmly clamp the siding and the head between the outer edge of the band and the inner part of the band.

In testimony whereof, I affix my signature.

EDWIN F. HULBERT.